(12) United States Patent
Gottlib

(10) Patent No.: US 11,086,746 B2
(45) Date of Patent: Aug. 10, 2021

(54) TECHNIQUES FOR COLLECTING AND ANALYZING NOTIFICATIONS RECEIVED FROM NEIGHBORING NODES ACROSS MULTIPLE CHANNELS

(71) Applicant: ITRON NETWORKED SOLUTIONS, INC., Liberty Lake, WA (US)

(72) Inventor: Elad Gottlib, San Ramon, CA (US)

(73) Assignee: ITRON NETWORKED SOLUTIONS, INC., Liberty Lake, WA (US)

( * ) Notice: Subject to any disclaimer, the term of this patent is extended or adjusted under 35 U.S.C. 154(b) by 33 days.

(21) Appl. No.: 16/735,485

(22) Filed: Jan. 6, 2020

(65) Prior Publication Data

US 2020/0201734 A1 Jun. 25, 2020

Related U.S. Application Data

(63) Continuation of application No. 15/714,881, filed on Sep. 25, 2017, now Pat. No. 10,528,445, which is a
(Continued)

(51) Int. Cl.
| | | |
|---|---|---|
| *G06F 11/30* | (2006.01) | |
| *H04L 12/26* | (2006.01) | |
| *H04L 12/24* | (2006.01) | |

(52) U.S. Cl.
CPC ...... *G06F 11/3055* (2013.01); *G06F 11/3006* (2013.01); *H04L 41/0677* (2013.01);
(Continued)

(58) Field of Classification Search
CPC ............ G06F 11/3035; G06F 11/3006; H04L 43/065; H04L 43/0817; Y04S 40/168
See application file for complete search history.

(56) References Cited

U.S. PATENT DOCUMENTS 7,551,552 B2  6/2009  Dunagan et al.
7,617,376 B2  11/2009  Chadalapaka et al.
(Continued)

FOREIGN PATENT DOCUMENTS

| CN | 101014040 A | 8/2007 |
|---|---|---|
| CN | 102882720 A | 1/2013 |
| WO | 2013/102498 A1 | 7/2013 |

OTHER PUBLICATIONS

Khan, M.M.H., "Troubleshooting Interactive Complexity Bugs in Wireless Sensor Networks Using Data Mining Techniques", ACM Transactions on Sensor Networks, vol. 10, No. 2, Article 31, Jan. 31, 2014, pp. 1-35, XP058035244.

*Primary Examiner* — Nadeem Iqbal
(74) *Attorney, Agent, or Firm* — Artegis Law Group, LLP

(57) ABSTRACT

A node in network is configured to buffer data received from other nodes across multiple channels. The node process a portion of the buffered data associated with a subset of those channels. When the node receives data on that subset of channels that includes a notification, the node then processes a larger portion of the buffered data associated with a larger number of channels. In doing so, the node may identify additional notifications include within data that was buffered but not previously processed. The node may also coordinate with other nodes in order to process buffered data upon identification of a notification.

21 Claims, 13 Drawing Sheets

Related U.S. Application Data continuation of application No. 14/659,482, filed on Mar. 16, 2015, now Pat. No. 9,772,921.

(60) Provisional application No. 61/954,068, filed on Mar. 17, 2014.

(52) U.S. Cl.
CPC ........ H04L 43/065 (2013.01); H04L 43/0817 (2013.01); *Y04S 40/00* (2013.01)

(56) References Cited

U.S. PATENT DOCUMENTS

| | | | |
|---|---|---|---|
| 7,730,220 B2 | 6/2010 | Hasha et al. | |
| 8,108,715 B1* | 1/2012 | Agarwal | G06F 11/1425 |
| | | | 714/10 |
| 8,779,921 B1 | 7/2014 | Curtiss | |
| 9,001,676 B2 | 4/2015 | Hui et al. | |
| 9,438,471 B1* | 9/2016 | Amdahl | H04L 43/0817 |
| 9,772,921 B2* | 9/2017 | Gottlib | H04L 41/0677 |
| 10,528,445 B2* | 1/2020 | Gottlib | H04L 41/0677 |
| 2002/0083195 A1 | 6/2002 | Beshai et al. | |
| 2005/0038941 A1 | 2/2005 | Chadalapaka et al. | |
| 2005/0083834 A1 | 4/2005 | Dunagan et al. | |
| 2005/0097300 A1 | 5/2005 | Gildea et al. | |
| 2007/0002774 A1 | 1/2007 | Hasha et al. | |
| 2009/0262642 A1 | 10/2009 | Van Greunen et al. | |
| 2011/0221603 A1 | 9/2011 | Deaver, Sr. et al. | |
| 2012/0209971 A1 | 8/2012 | Howe | |
| 2013/0028295 A1 | 1/2013 | Hui et al. | |
| 2013/0181848 A1 | 7/2013 | Picard | |
| 2013/0227669 A1 | 8/2013 | Elzur | |
| 2013/0229947 A1 | 9/2013 | Vaswani et al. | |
| 2013/0297904 A1 | 11/2013 | Stanfill et al. | |
| 2014/0226579 A1* | 8/2014 | Roy | H04L 45/72 |
| | | | 370/329 |

* cited by examiner

TECHNIQUES FOR COLLECTING AND ANALYZING NOTIFICATIONS RECEIVED FROM NEIGHBORING NODES ACROSS MULTIPLE CHANNELS

CROSS-REFERENCE TO RELATED APPLICATIONS

This application is a continuation of the co-pending U.S. patent application titled, "TECHNIQUES FOR COLLECTING AND ANALYZING NOTIFICATIONS RECEIVED FROM NEIGHBORING NODES ACROSS MULTIPLE CHANNELS," filed on Sep. 25, 2017 and having Ser. No. 15/714,881, which is a continuation of U.S. patent application titled, "TECHNIQUES FOR COLLECTING AND ANALYZING NOTIFICATIONS RECEIVED FROM NEIGHBORING NODES ACROSS MULTIPLE CHANNELS," filed on Mar. 16, 2015 and having Ser. No. 14/659,482, issued as U.S. Pat. No. 9,772,921, which claims the priority benefit of the United States provisional patent application titled, "MULTIPLE CHANNEL RECEIVER CRITICAL ALERT IDENTIFICATION," filed on Mar. 17, 2014 and having Ser. No. 61/954,068. The subject matter of these related applications is hereby incorporated herein by reference

BACKGROUND OF THE INVENTION

Field of the Invention

Embodiments of the present invention relate generally to wireless network communications and, more specifically, to techniques for collecting and analyzing notifications received from neighboring nodes across a range of channels.

Description of the Related Art

A conventional wireless mesh network includes a plurality of nodes configured to communicate with one another across various communication links. Nodes in the network typically draw power from an electricity grid in order to perform various operations, including communication operations and data processing operations. Under various circumstances, power outages may occur at certain locations within the grid, and nodes that reside in those locations may lose power and go offline.

In anticipation of such circumstances, a conventional node is typically configured to include an energy resource that allows the node to function for a short time after power has been lost. This short amount of time is generally sufficient to transmit a notification across the network indicating that the node will imminently lose power and disappear from the network. This type of message is known in the art as a "last gasp" message. A management entity responsible for the network collects last gasp messages from nodes in affected regions and then dispatches technicians to bring those nodes back online.

One problem with this approach to network management is that the energy resource in a conventional node typically includes enough energy to transmit only a limited number of last gasp messages on a limited number of channels to a limited number of neighboring nodes. If none of the neighboring nodes are currently listening on the channels on which the last gasp messages are transmitted, then the last gasp messages may not be able to propagate beyond those neighboring nodes to the management entity. When the management entity is not aware that certain nodes within the network have gone offline, there is no real way to dispatch resources or take steps to bring those nodes back online.

Another problem with the above approach to network management is that power outages often affect a large number of nodes simultaneously, thereby inducing the transmission of a large number of last gasp messages. Such rapid increases in traffic across the network can overwhelm the intermediate nodes within the network that are configured to relay network traffic, resulting in lost last gasp messages. Again, when a particular last gasp message is lost, the node that sent the lost message may not receive the services necessary to bring that node back online.

As the foregoing illustrates, what is needed in the art is a more effective way to transmit last gasp messages and other types of notifications across wireless mesh networks.

SUMMARY OF THE INVENTION

One embodiment of the present invention sets forth a computer-implemented method for processing buffered data to identify notifications, including receiving data from a plurality of nodes across a plurality of channels, storing the data in a buffer, processing data stored in the buffer that is associated with a first channel included in the plurality of channels to identify a first notification received from a first node included in the plurality of nodes, and, in response to identifying the first notification, processing data stored in the buffer that is associated with one or more other channels included in the plurality of channels to identify one or more additional notifications received from at least one other node included in the plurality of nodes.

At least one advantage of the techniques described herein is that the node is capable of identifying notifications received on channels to which the node was not actively listening. Accordingly, notifications that would otherwise be unnoticed by the node can be processed and forwarded across the network, thereby increasing the reliability of the network as a whole.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
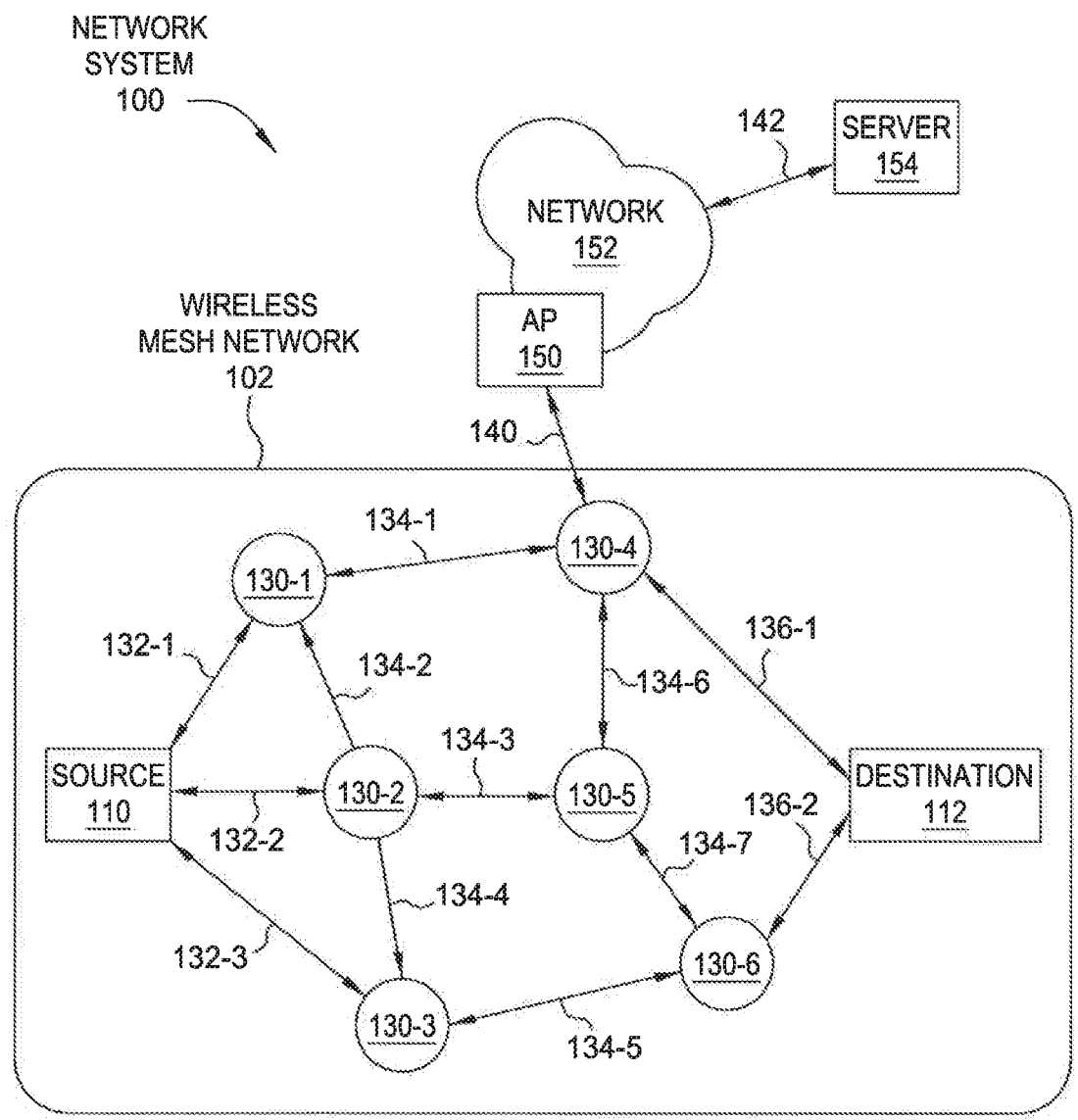
FIG. 1 illustrates a network system configured to implement one or more aspects of the present invention.

FIG. 1 illustrates a network system 100 configured to implement one or more aspects of the invention. As shown, the network system 100 includes a wireless mesh network 102, which may include a source node 110, intermediate nodes 130 and destination node 112. The source node 110 is able to communicate with certain intermediate nodes 130 via communication links 132. The intermediate nodes 130 communicate among themselves via communication links 134. The intermediate nodes 130 communicate with the destination node 112 via communication links 136. The network system 100 may also include an access point 150, a network 152, and a server 154.

A discovery protocol may be implemented to determine node adjacency to one or more adjacent nodes. For example, intermediate node 130-2 may execute the discovery protocol to determine that nodes 110, 130-1, 130-3, and 130-5 are adjacent to node 130-2. Furthermore, this node adjacency indicates that communication links 132-2, 134-2, 134-4 and 134-3 may be established between the nodes 110, 130-1, 130-3, and 130-5, respectively. Any technically feasible discovery protocol may be implemented without departing from the scope and spirit of embodiments of the present invention.

The discovery protocol may also be implemented to determine the hopping sequences of adjacent nodes, i.e. the sequence of channels across which nodes periodically receive payload data. As is known in the art, a "channel" may correspond to a particular range of frequencies. Once adjacency is established between the source node 110 and at least one intermediate node 130, the source node 110 may generate payload data for delivery to the destination node 112, assuming a path is available. The payload data may comprise an Internet protocol (IP) packet, an Ethernet frame, or any other technically feasible unit of data. Similarly, any technically feasible addressing and forwarding techniques may be implemented to facilitate delivery of the payload data from the source node 110 to the destination node 112. For example, the payload data may include a header field configured to include a destination address, such as an IP address or Ethernet media access control (MAC) address.

Each intermediate node 130 may be configured to forward the payload data based on the destination address. Alternatively, the payload data may include a header field configured to include at least one switch label to define a predetermined path from the source node 110 to the destination node 112. A forwarding database may be maintained by each intermediate node 130 that indicates which communication link 132, 134, 136 should be used and in what priority to transmit the payload data for delivery to the destination node 112. The forwarding database may represent multiple paths to the destination address, and each of the multiple paths may include one or more cost values. Any technically feasible type of cost value may characterize a link or a path within the network system 100. In one embodiment, each node within the wireless mesh network 102 implements substantially identical functionality and each node may act as a source node, destination node or intermediate node.

In network system 100, the access point 150 is configured to communicate with at least one node within the wireless mesh network 102, such as intermediate node 130-4. Communication may include transmission of payload data, timing data, or any other technically relevant data between the access point 150 and the at least one node within the wireless mesh network 102. For example, communications link 140 may be established between the access point 150 and intermediate node 130-4 to facilitate transmission of payload data between wireless mesh network 102 and network 152. The network 152 is coupled to the server 154 via communications link 142. The access point 150 is coupled to the network 152, which may comprise any wired, optical, wireless, or hybrid network configured to transmit payload data between the access point 150 and the server 154.

In one embodiment, the server 154 represents a destination for payload data originating within the wireless mesh network 102 and a source of payload data destined for one or more nodes within the wireless mesh network 102. In one embodiment, the server 154 is computing device, including a processor and memory, and executes an application for interacting with nodes within the wireless mesh network 102. For example, nodes within the wireless mesh network 102 may perform measurements to generate measurement data, such as power consumption data. The server 154 may execute an application to collect the measurement data and report the measurement data. In one embodiment, the server 154 queries nodes within the wireless mesh network 102 for certain data. Each queried node replies with requested data, such as consumption data, system status and health data, and so forth. In an alternative embodiment, each node within the wireless mesh network 102 autonomously reports certain data, which is collected by the server 154 as the data becomes available via autonomous reporting.

The techniques described herein are sufficiently flexible to be utilized within any technically feasible network environment including, without limitation, a wide-area network (WAN) or a local-area network (LAN). Moreover, multiple network types may exist within a given network system 100. For example, communications between two nodes 130 or between a node 130 and the corresponding access point 150 may be via a radio-frequency local-area network (RF LAN), while communications between access points 150 and the network may be via a WAN such as a general packet radio service (GPRS). As mentioned above, each node within wireless mesh network 102 includes a network interface that enables the node to communicate wirelessly with other nodes. Each node 130 may implement the first and/or second embodiments of the invention, as described above, by operation of the network interface. An exemplary network interface is described below in conjunction with FIG. 2.

Figure 2:
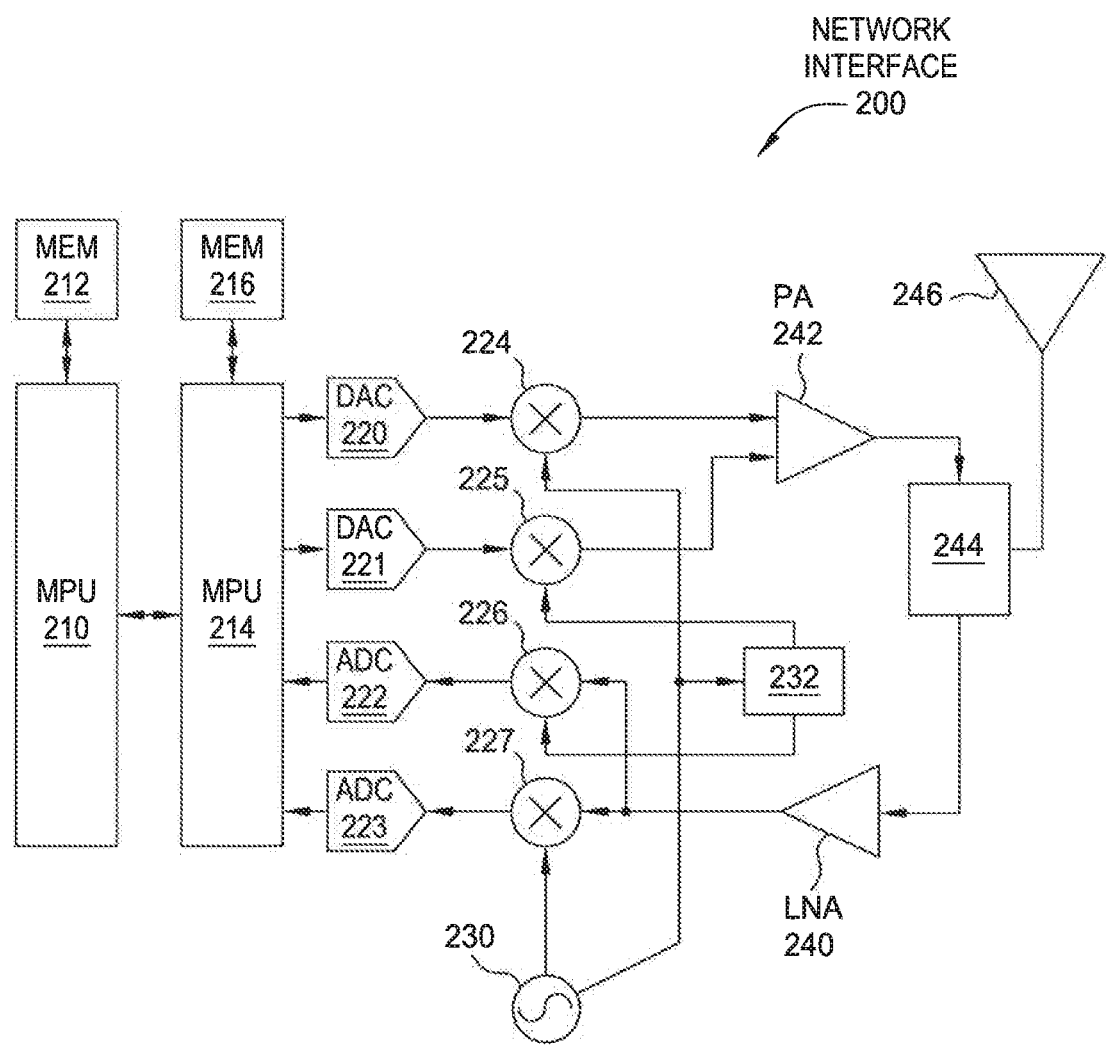
FIG. 2 illustrates a network interface configured to transmit and receive data within a mesh network, according to one embodiment of the present invention.

FIG. 2 illustrates a network interface configured to transmit and receive data within a mesh network, according to one embodiment of the invention. Each node 110, 112, 130 within the wireless mesh network 102 of FIG. 1 includes at least one instance of the network interface 200. The network interface 200 may include, without limitation, a microprocessor unit (MPU) 210, a digital signal processor (DSP) 214, digital to analog converters (DACs) 220, 221, analog to digital converters (ADCs) 222, 223, analog mixers 224, 225, 226, 227, a phase shifter 232, an oscillator 230, a power amplifier (PA) 242, a low noise amplifier (LNA) 240, an antenna switch 244, and an antenna 246. A memory 212 may be coupled to the MPU 210 for local program and data storage. Similarly, a memory 216 may be coupled to the DSP 214 for local program and data storage. Memory 212 and/or memory 216 may be used to buffer incoming data as well as store data structures such as, e.g., a forwarding database, and/or routing tables that include primary and secondary path information, path cost values, and so forth.

In one embodiment, the MPU 210 implements procedures for processing IP packets transmitted or received as payload data by the network interface 200. The procedures for processing the IP packets may include, without limitation, wireless routing, encryption, authentication, protocol translation, and routing between and among different wireless and wired network ports. In one embodiment, MPU 210 implements the techniques performed by the node, as described in conjunction with FIGS. 1 and 3A-5, when MPU 210 executes a firmware program stored in memory within network interface 200.

The MPU 214 is coupled to DAC 220 and DAC 221. Each DAC 220, 221 is configured to convert a stream of outbound digital values into a corresponding analog signal. The outbound digital values are computed by the signal processing procedures for modulating one or more channels. The MPU 214 is also coupled to ADC 222 and ADC 223. Each ADC 222, 223 is configured to sample and quantize an analog signal to generate a stream of inbound digital values. The inbound digital values are processed by the signal processing procedures to demodulate and extract payload data from the inbound digital values.

In one embodiment, MPU 210 and/or MPU 214 are configured to buffer incoming data within memory 212 and/or memory 216. The incoming data may be buffered in any technically feasible format, including, for example, raw soft bits from individual channels, demodulated bits, raw ADC samples, and so forth. MPU 210 and/or MPU 214 may buffer within memory 212 and/or memory 216 any portion of data received across the set of channels from which antenna 246 receives data, including all such data. MPU 210 and/or MPU 214 may then perform various operations with the buffered data, including demodulation operations, decoding operations, and so forth.

Persons having ordinary skill in the art will recognize that network interface 200 represents just one possible network interface that may be implemented within wireless mesh network 102 shown in FIG. 1, and that any other technically feasible device for transmitting and receiving data may be incorporated within any of the nodes within wireless mesh network 102.

Referring back now to FIG. 1, under various circumstances, nodes 130 may transmit notifications to server 154 that reflect various operating conditions associated with those nodes 130. The operating conditions associated with a given node 130 could include, for example, a set of environmental conditions and/or events detected by the node 130, status information associated with the portion of the wireless mesh network 202 to which the node 130 is coupled, and status information associated with a utility grid the node 130 is configured to monitor.

In one embodiment, a given node 130 may transmit a notification when the node 130 suddenly loses power and will imminently go offline. A notification of this type may be referred to in the art as a "last gasp" message. In such embodiments, the node 130 may include an energy resource (not shown) that allows the node 130 to operate for a period of time without external power. For example, the node 130 could include a capacitor, battery, or other form of energy storage. When the node 130 suddenly loses power, the node 130 may draw from the energy resource in order to transmit the "last gasp" notification to server 154. Server 154 may collect many such last gasp messages and then perform various actions, including estimating the severity of a network-wide event, dispatching technicians to service offline nodes, and so forth.

Nodes 130 are configured to perform various techniques that may improve the likelihood that the notifications discussed above successfully traverse the wireless mesh network 202 and reach server 154. One such technique is described below in conjunction with FIGS. 3-5. Another such technique is described below in conjunction with FIGS. 6-8B.

Collecting Notifications Received Across Multiple Channels

Figure 3:
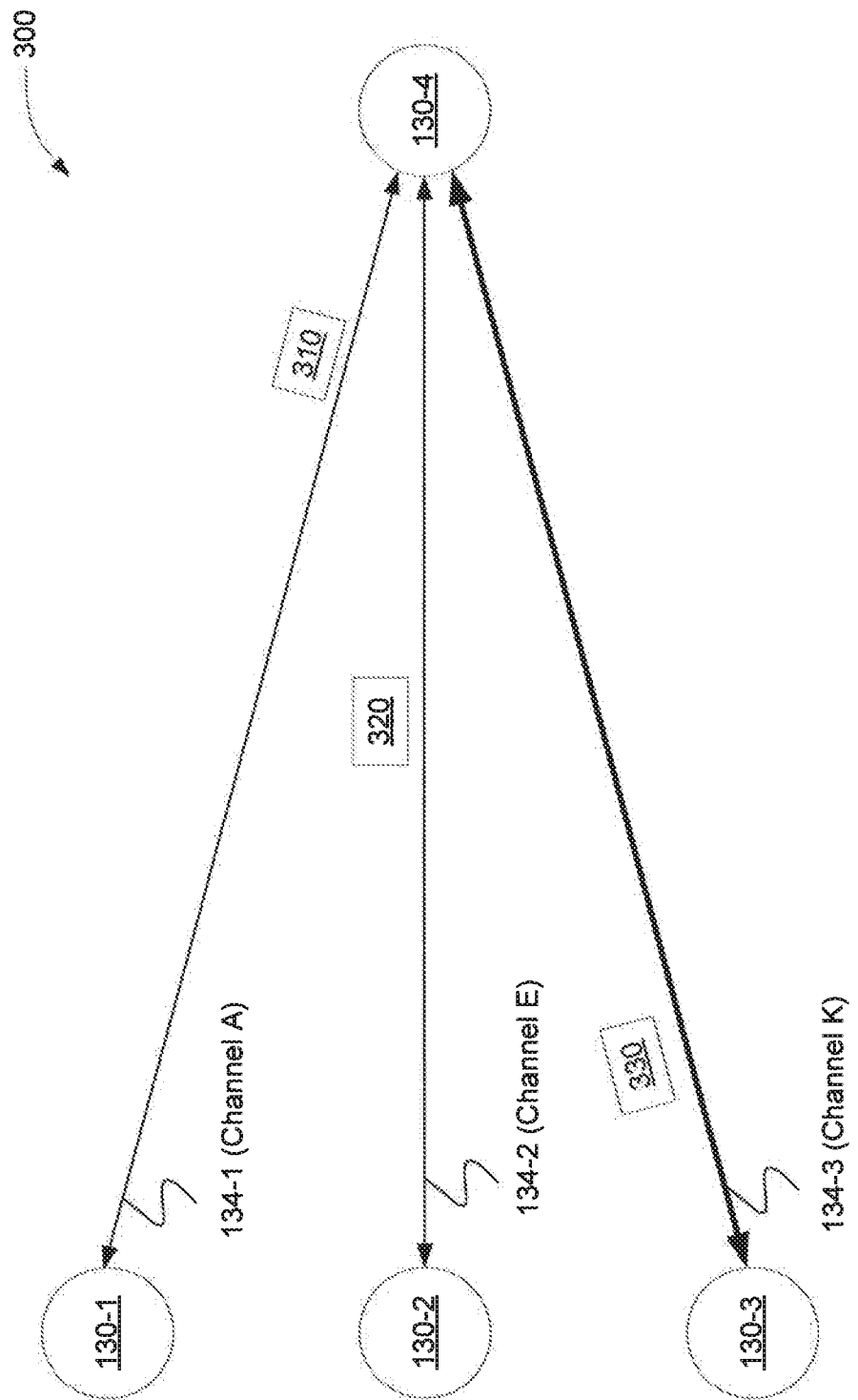
FIG. 3 illustrates a portion of the wireless mesh network of FIG. 1 that includes a plurality of upstream nodes transmitting data to a downstream node, according to one embodiment of the present invention.

FIG. 3 illustrates a portion 300 of the wireless mesh network of FIG. 1 that includes a plurality of upstream nodes transmitting data to a downstream node. As shown, portion 300 includes nodes 130-1, 130-2, 130-3, and 130-4. Nodes 130-1, 130-2, and 130-3 are coupled to node 130-4 via communication links 134-1, 134-2, and 134-3, respectively. Communication links 134-1, 134-2, and 134-3 may correspond to channels A, E, and K, respectively, at a given point in time.

As mentioned above in conjunction with FIG. 1, a "channel," as referred to herein, generally reflects a range of frequencies. Accordingly, nodes 130-1 and 130-4 may exchange information across communication link 134-1 on the range of frequencies associated with channel A. Likewise, nodes 130-2 and 130-4 may exchange information across communication link 134-2 on the range of frequencies associated with channel E, and nodes 130-3 and 130-4 may exchange information across communication link 134-3 on the range of frequencies associated with channel K.

In the exemplary scenario discussed herein, nodes 130-1, 130-2, and 130-3 are configured to transmit data 310, 320, and 330, respectively, to node 130-4 at different times. Specifically, node 130-1 transmits data 310 across communication link 134-1 on the range of frequencies associated with channel A, node 130-2 transmits data 320 across the range of frequencies associated with communication link 134-2 on channel E, and node 130-3 transmits data 330 across communication link 134-3 on the range of frequencies associated with channel K. Data 310, 320, and 330 may generally includes a data packet, a portion of a data packet, a set of bits, a radio signal, a set of frequencies and corresponding magnitudes, or any other technically feasible form of data. In addition, data 310, 320, and 330 generally includes information associated with notifications that reflect the operating state of nodes 130-1, 130-2, and 130-3, respectively.

Node 130-4 is configured to buffer all data received across a range of channels on which node 130-4 receives data, including data 310, 320, and 330 received across channels A, E, and K, respectively. Node 130-4 may then process buffered data corresponding to a subset of those channels. In processing that buffered data, node 130-4 performs various processing operations, including demodulation and decoding operations, among others. Node 130-4 performs such processing operations to identify data packets and associated payload data included within the buffered data, such as notifications, among other things. In the following disclosure, when node 130-4 is configured to process the buffered data corresponding to a particular subset of channels, node 130-4 may be described as "listening" to that particular subset of channels, and that subset of channels may be referred to as the "actively listened" channels.

In FIG. 3, node 130-4 is configured to listen to channel K, as indicated by the emphasis shown on communication link 134-3. Accordingly, when node 130-4 receives data 330, node 130-4 processes that data and may then perform various operations in response. For example, node 130-4 could forward the data to a particular destination across wireless mesh network 202, such as server 154, or store that data for later delivery. Since node 130-4 is not currently listening to channels A and E, when node 130-4 receives data 310 and 320, node 130-4 may not immediately process that data, and therefore may not perform specific operations in response.

In a conventional network composed of conventional nodes, the scenario described above typically results in data 310 and 320 simply becoming lost, since node 130-4 is not actively listening on channels A and E when that data is received. However, node 130-4 is configured to implement a specific technique in order to prevent that data from being lost, as described in greater detail below in conjunction with FIGS. 4A-4C.

Figure 4A:
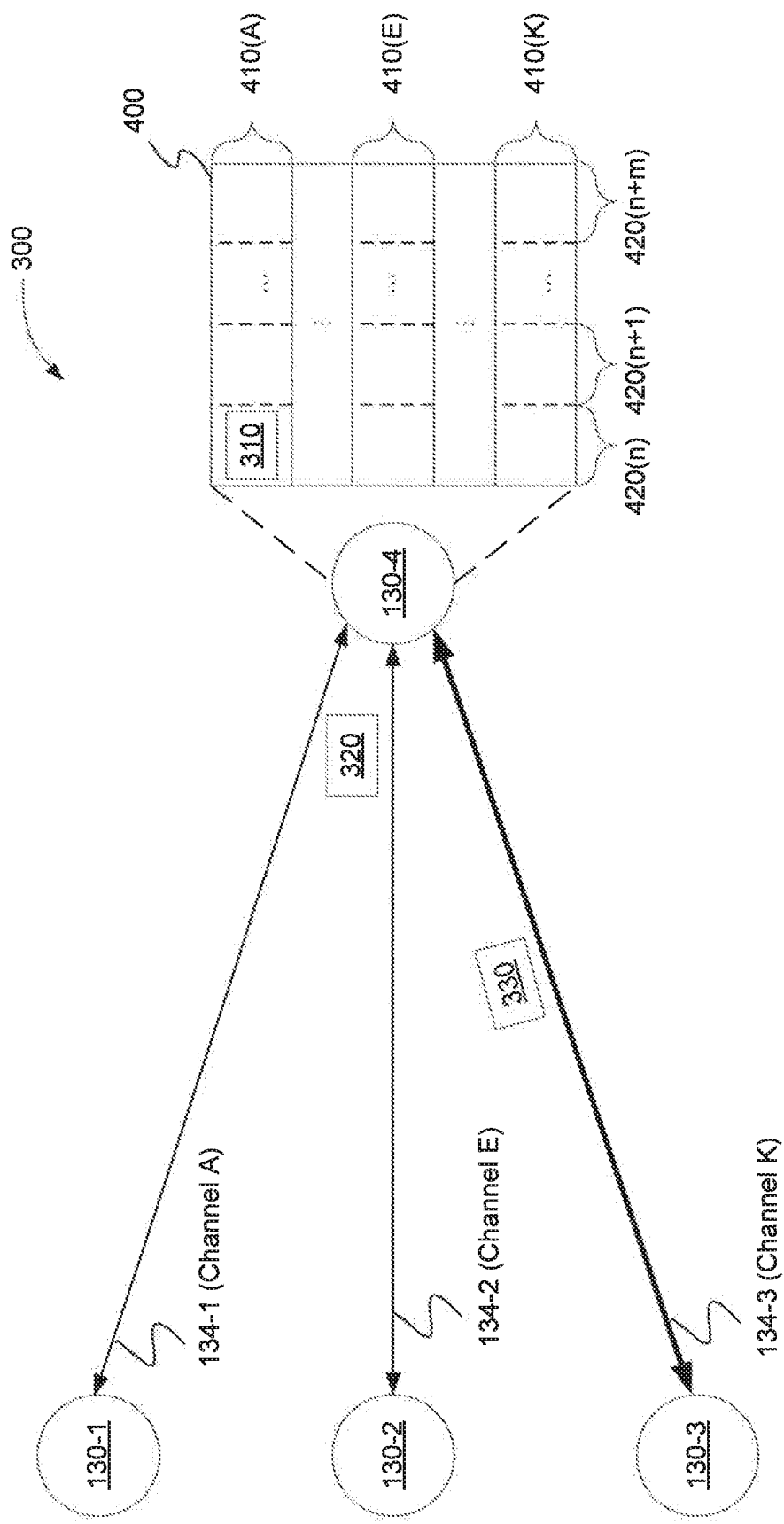
FIGS. 4A-4C illustrate the downstream node of FIG. 3 configured to buffer notifications received from the plurality of upstream nodes, according to one embodiment of the present invention.
Figure 4B:
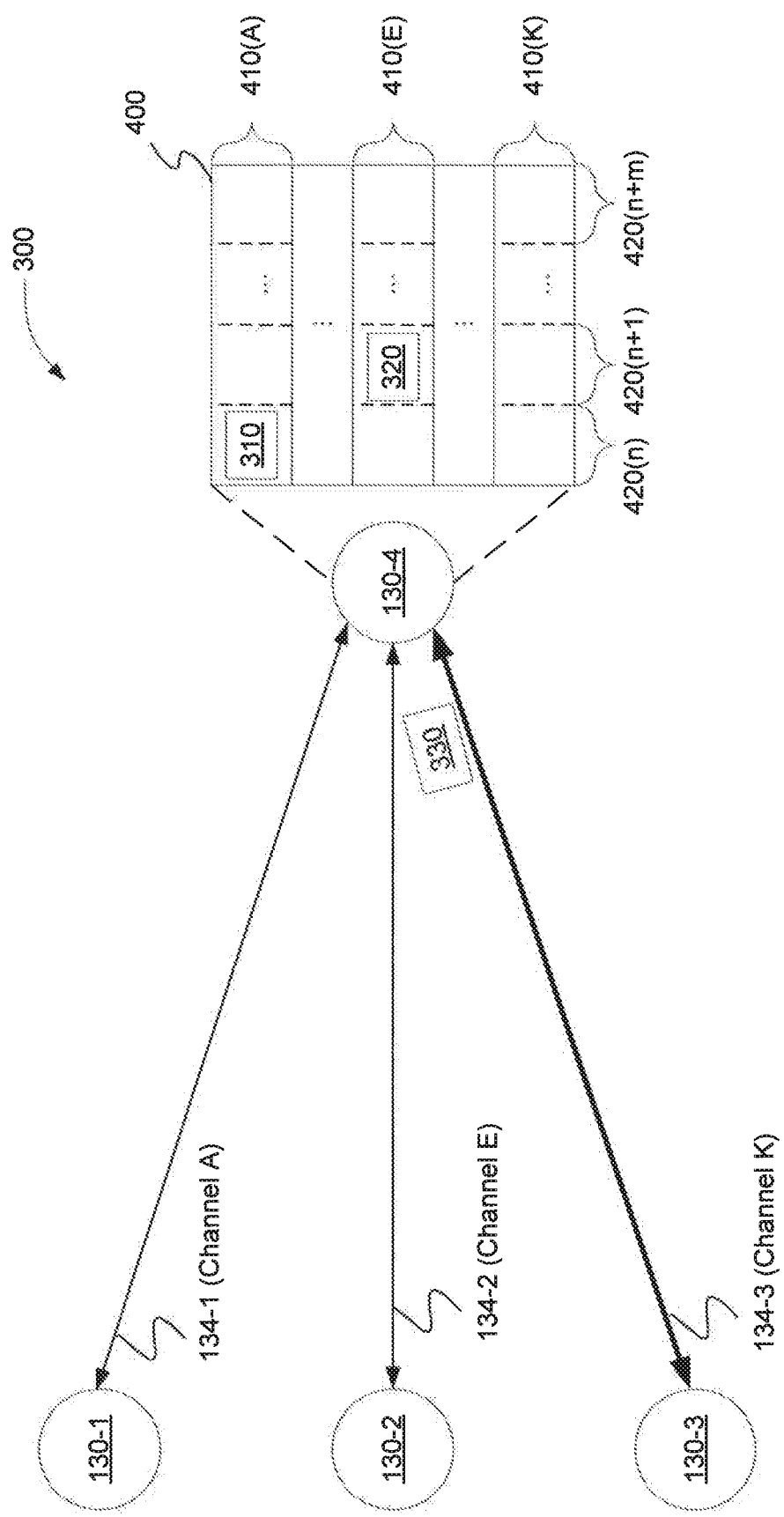
Figure 4C:
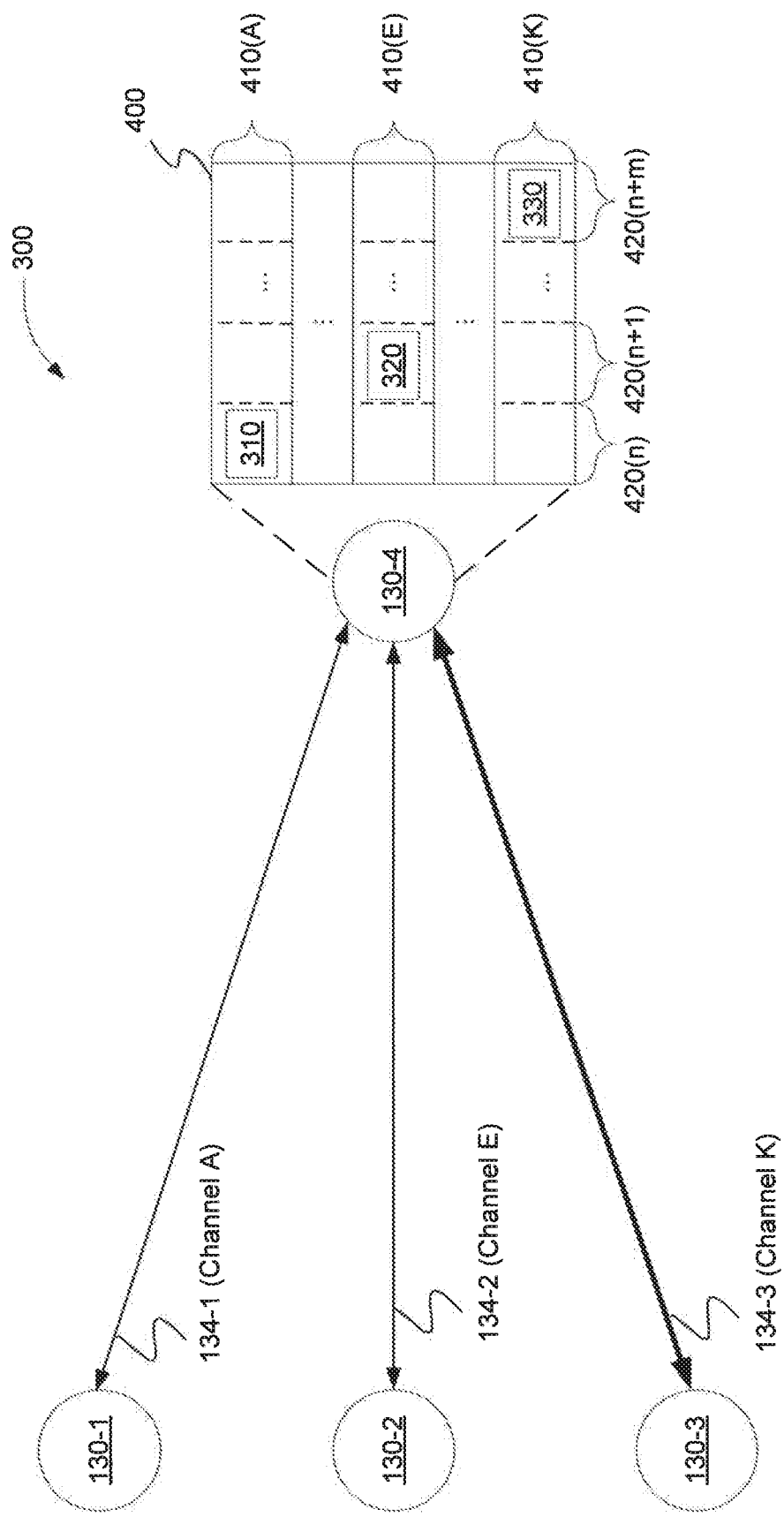

FIGS. 4A-4C illustrate the downstream node 130-4 of FIG. 3 configured to buffer notifications received from the plurality of upstream nodes 130-1, 130-2, and 130-3, according to one embodiment of the present invention.

As shown in FIG. 4A, node 130-4 includes a buffer 400 that includes a set of rows 410. Each row 410 corresponds to a different channel on which node 130-4 may receive data. Specifically, buffer 400 includes a row 410(A) corresponding to channel A, a row 410(E) corresponding to channel E, and a row 410(K) corresponding to channel K. In practice, buffer 400 may include many different rows 410, although for simplicity, and for exemplary purposes, only several rows 410 are shown.

As also shown, buffer 400 includes as set of columns 420. Each column 420 corresponds to a different time when node 130-4 may receive data. Specifically, buffer includes column 420(n) corresponding to a time $t_n$ when node 130-4 receives data, column 420(n+1) corresponding to a time $t_{n+1}$ when node 130-4 receives data, and column 420(n+m) corresponding to a time $t_{n+m}$ when node 130-4 receives data.

When node 130-4 receives data on a specific channel at a specific time, node 130-4 buffers that data within the row 410 of buffer 400 corresponding to that specific channel and within the column 420 of buffer 410 corresponding to that specific time. Although node 130-4 generally buffers all received data, under normal circumstances node 130-4 may only process the specific rows 410 of buffer 400 corresponding to the actively listened channels.

In the exemplary scenario shown, node 130-4 receives data 310 on channel A at time $t_n$, and then buffers that data within row 410(A) at column 420(n). However, since node 130-4 is not listening to channel A at time $t_n$, node 130-4 may not immediately process data 310 and simply continues buffering data, as described below in conjunction with FIG. 4B.

In FIG. 4B, node 130-4 receives data 320 on channel E at time $t_{n+1}$. Node 130-4 then buffers that data within row 410(E) at column 420(n+1). However, since node 130-4 is not listening to channel E at time $t_{n+1}$, node 130-4 may not immediately process data 320 and simply continue buffering data, as described below in conjunction with FIG. 4C.

In FIG. 4C, node 130-4 receives data 330 on channel K at time $t_{n+m}$. Node 130-4 then buffers that data within row 410(K) at column 420(n+m). Since node 130-4 is, in fact, listening to channel K at time $t_{n+m}$, node 130-4 then processes data 330. In doing so, node 130-4 may decode data 330 and identify a notification included therein.

The notification indicates the operational state of node 130-3, and may include a set of environmental conditions and/or events detected by the node 130-3, status information associated with wireless mesh network 202, or status information associated with a utility grid the node 130 is configured to monitor. In one embodiment, the notification is a "last gasp" message indicating that node 130-3 has lost power and will imminently go offline.

Generally, the notification identified within data 330 indicates to node 130-4 that other nodes 130 may have also transmitted notifications. For example, the notification could indicate a network event, such as a power outage, sag, or swell, which would likely also affect nodes 130-1 and 130-2 and cause those nodes to transmit notifications. In another example, the notification could indicate an environmental event, such as inclement weather, a fire, or explosion, which would likely also affect nodes 130-1 and 130-2 and cause those nodes to transmit notifications.

Accordingly, when node 130-4 receives data 310 and identifies a notification included therein, node 130-4 begins processing all rows 410 instead of only processing row 410(K). In doing so, node 130-4 discovers that data 310 was received at time $t_n$ and data 320 was received at time $t_{n+1}$. Node 130-4 then processes data 310 and 320 and identifies additional notifications. In this fashion, node 130-4 is capable of receiving and processing data on any channel, including channels that are not actively listened, in response to data that is received on an actively listened channel. This functionality reflects a significant improvement over conventional nodes, which simply ignore data that is not received on an actively listened channel.

Node 130-4 may perform various actions in response to identifying notifications, including forwarding all such notifications to server 154. Server 154 may process the various notifications to determine the severity of a given network event. For example, if the received notifications included temperature information, server 154 could determine whether a fire had occurred and, potentially, the severity of the fire. In another example, if the received notifications represented "last gasp" messages, server 154 could determine the extent of a power outage experienced by a utility grid to which nodes 130-1, 130-2, and 130-3 are coupled. Since the accuracy of the above determinations depends on the number of notifications received, the techniques discussed herein increase the accuracy of those determinations by facilitating the delivery of additional notifications to server 154.

In one embodiment, node 130-4 may process received notifications and then identify various network events occurring within the region of the network coupled upstream of node 130-4. For example, node 130-4 could process data 310, 320, and 330 to identify notifications included therein, and then identify an event that affects nodes 130-1, 130-2, and 130-3, including power outages and other network-wide events. Node 130-4 may also determine the severity of such events in like fashion as described above relative to server 154. Node 130-4 may report the results of any and all such processing to server 154, and server 154 may then perform various corrective actions.

Nodes 130 within wireless mesh network 202 may be configured to augment the techniques described above by distributing the transmission of data associated with notifications across many different channels, thereby preventing any one channel from becoming overburdened transporting that data. This approach may be especially effective when a widespread network event causes many affected nodes 130 to transmit notifications upstream simultaneously. Since an upstream node 130 buffers all incoming data and then eventually processes that data when a notification is identified, the transmitting nodes 130 need not be restricted to transmitting on a particular channel in the hopping sequence. Nodes 130 may distribute the transmission of notifications in any technically feasible fashion. For example, prior to transmitting data associated with a notification, nodes 130 could switch to an assigned channel in a set of channels, where that channel has been assigned to achieve a relatively even distribution. Nodes 130 could also transmit notifications on a randomly selected channel.

The techniques described above in conjunction with FIGS. 1-4C are also described, in stepwise fashion, below in conjunction with FIG. 5.

Figure 5:
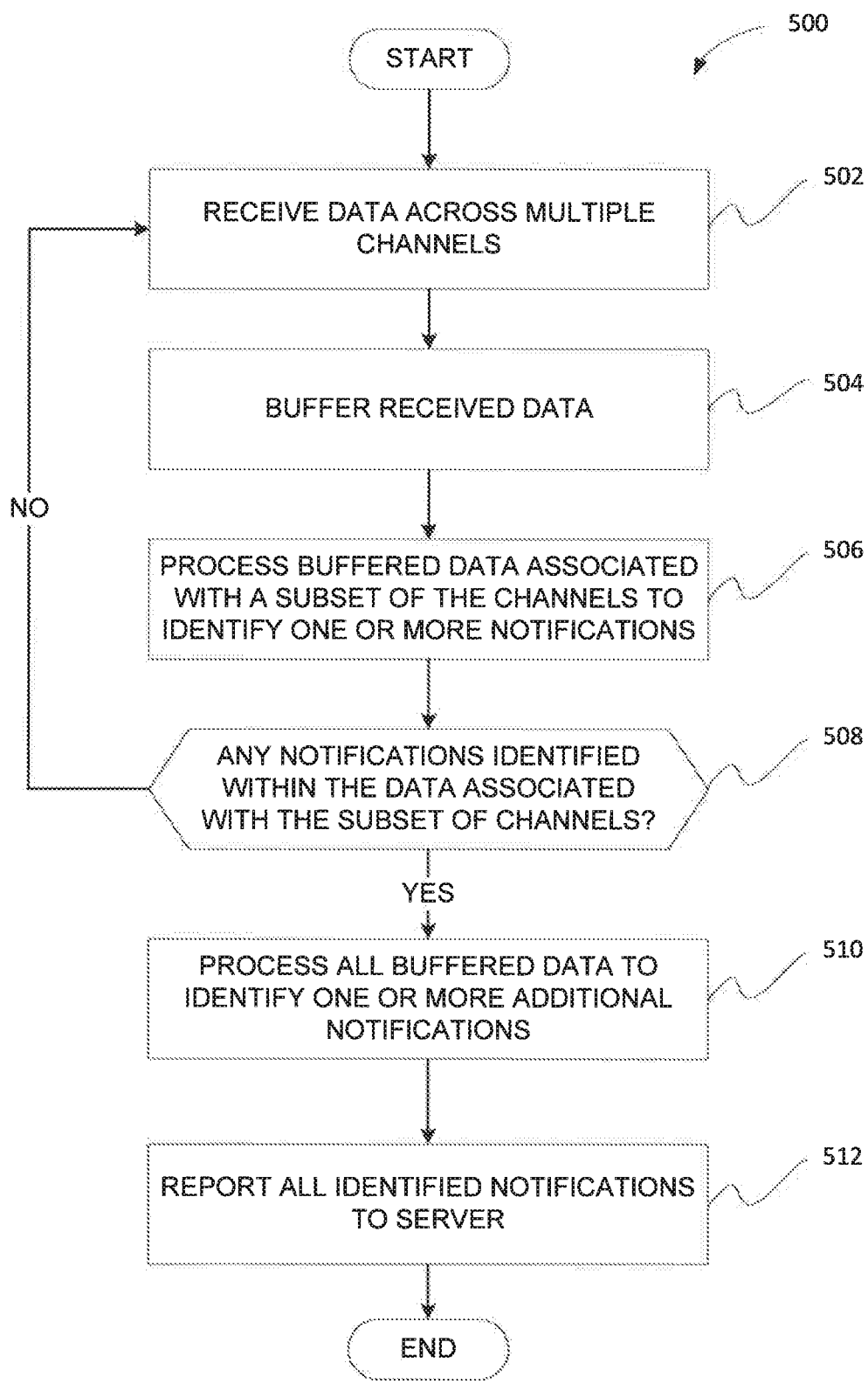
FIG. 5 is a flow diagram of method steps for identifying notifications stored within a buffer and subsequently processing the data within the buffer, according to one embodiment of the present invention.

FIG. 5 is a flow diagram of method steps for identifying notifications stored within a buffer and subsequently processing the data within the buffer, according to one embodiment of the present invention. Although the method steps are described in conjunction with the systems of FIGS. 1-4C, persons skilled in the art will understand that any system configured to perform the method steps, in any order, is within the scope of the present invention.

As shown, a method 500 begins at step 502, where a node 130 receives data across multiple channels associated with different upstream nodes. In some embodiments, there may be a different channel associated with each different upstream node. In other embodiments, one or more channels may be associated with a given upstream nodes. The data may be raw soft bits, demodulated bits, raw ADC samples, frequency and magnitude data, and so forth. The multiple channels may represent a band on which the node 130 is authorized to transmit and receive data. At step 504, the node 130 buffers the data received at step 502. In doing so, the node 130 may store the data in a buffer, such as buffer 400 shown in FIGS. 4A-4C.

At step 506, the node 130 processes buffered data that is associated with a subset of the multiple channels to identify one or more notifications that may be present in that data. The subset of the multiple channels generally reflects one or more channels to which to node 130 actively listens.

At step 508, the node 130 determines whether any notifications have been identified within the data associated with the subset of channels. If, at step 508, the node 130 does not identify any notifications, then the method 500 returns to step 502 and proceeds as described above. Otherwise, if the node 130 determines at step 508 that one or more notifications have been identified, then the method 500 proceeds to step 510. In one embodiment, the subset of channels comprises one channel, and the notification identified has been received by one of the upstream nodes from which received data is being buffered. In one embodiment, the node 130 may proceed from step 508 to step 510 upon determining that a threshold number of notifications have been identified.

At step 510, the node 130 processes all buffered data to identify additional notifications. In various embodiments, some or all of the additional notifications identified in step 510 are associated with upstream nodes that are different than the upstream node associated with the first notification identified in step 508. In some embodiments, in order to process the buffered data received from all of the different upstream nodes, the node 130 may stop buffering additional data, or may continue to buffer additional data in a separate buffer. In addition, the node 130 may process any portion of unprocessed data resident in the buffer. At step 512, the node 130 reports all identified notifications to an upstream server. The server could be, for example, server 154 or any other network management entity.

Referring generally to FIGS. 1-5, any given node 130 may implement the technique described thus far, thereby increasing the likelihood that notifications are identified. In addition, multiple nodes 130 can be configured to interoperate with one another in order to identify notifications. This functionality further increases the likelihood that those notifications traverse wireless mesh network 202 and reach server 154, as described in greater detail below in conjunction with FIGS. 6-8B.

Figure 6:
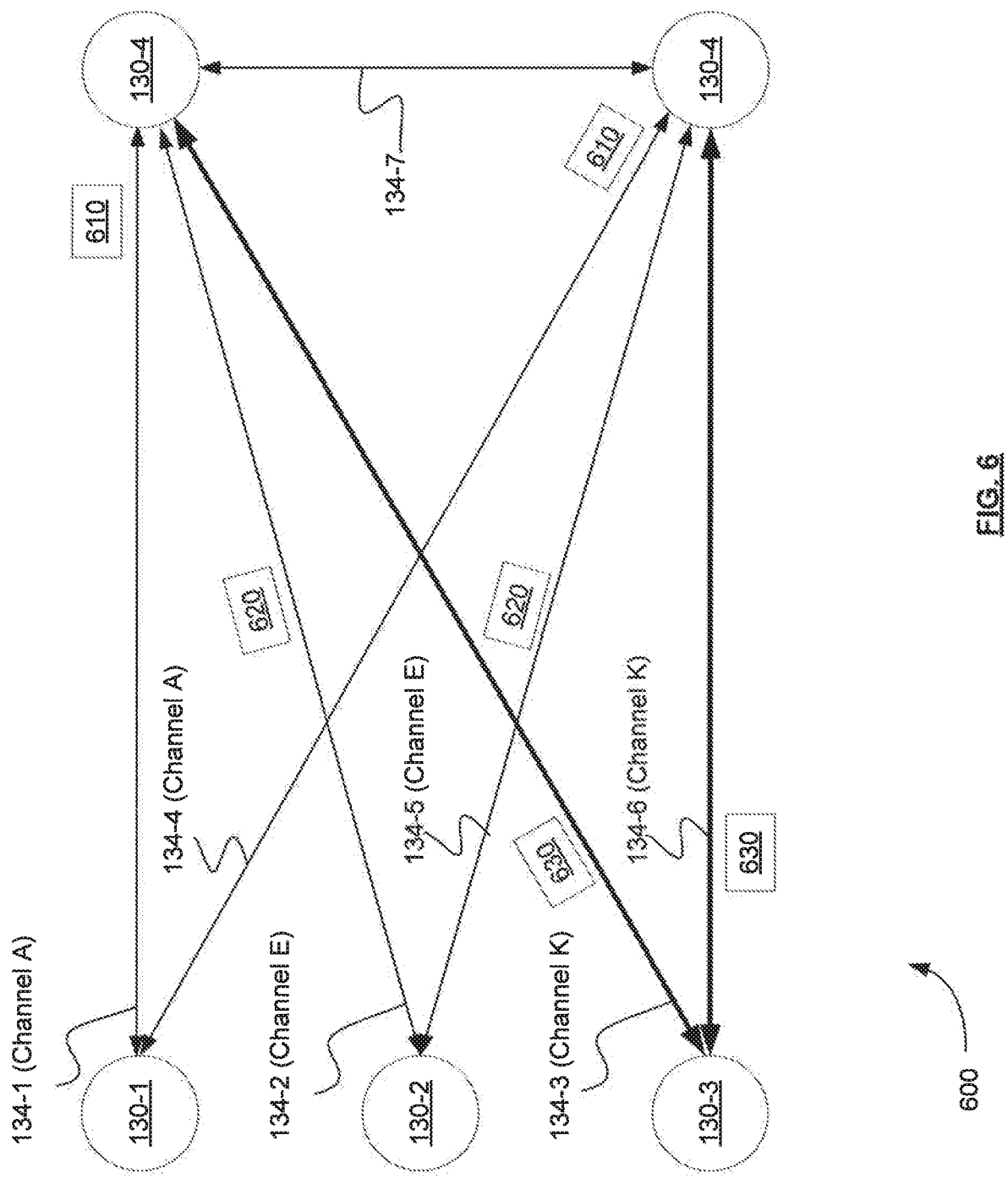
FIG. 6 illustrates another portion of the wireless mesh network of FIG. 1 that includes a plurality of upstream nodes transmitting data to a plurality of downstream nodes, according to one embodiment of the present invention.

FIG. 6 illustrates another portion of the wireless mesh network of FIG. 1 that includes a plurality of upstream nodes transmitting data to a plurality of downstream nodes, according to one embodiment of the present invention. As shown, a portion 600 of wireless mesh network 202 includes nodes 130-1, 130-2, 130-3, and 130-4, coupled together in like fashion as shown in FIGS. 3-5. In addition, portion 600 includes node 130-5 coupled to nodes 130-1, 130-2, 130-3, and 130-4 via communication links 134-4, 134-5, 134-6, and 134-7, respectively. Like communication links 134-1, 134-2, and 134-3, communication links 134-4, 134-5, and 134-6 are associated with channels A, E, and K, respectively.

Nodes 130-1, 130-2, and 130-3 are configured to transmit data 610, 620, and 630, respectively, to nodes 130-4 and 130-5, as is shown. Specifically, node 130-1 transmits data 610 across communication links 134-1 and 134-4 to nodes 130-4, and 130-5, respectively, on the set of frequencies associated with channel A. Similarly, node 130-2 transmits data 620 across communication links 134-2 and 134-5 to nodes 130-4, and 130-5, respectively, on the set of frequencies associated with channel E, and node 130-3 transmits data 630 across communication links 134-3 and 134-6 to nodes 130-4, and 130-5, respectively, on the set of frequencies associated with channel K.

Node 130-4 is configured to listen on channel K, and so node 130-4 may not immediately detect that data 610 or data 620 have been received and, thus, may not immediately process data 610 or data 620. Node 130-5 may not be listening on any of channels A, E, or K, and, thus, may not immediately detect that any of data 610, 620, or 630 has been received. However, nodes 130-4 and 130-5 are configured to implement a technique for processing data that was previously received on channels that were not actively listened at the time of receipt. This technique is described in greater detail below in conjunction with FIGS. 7A-7C.

Figure 7A:
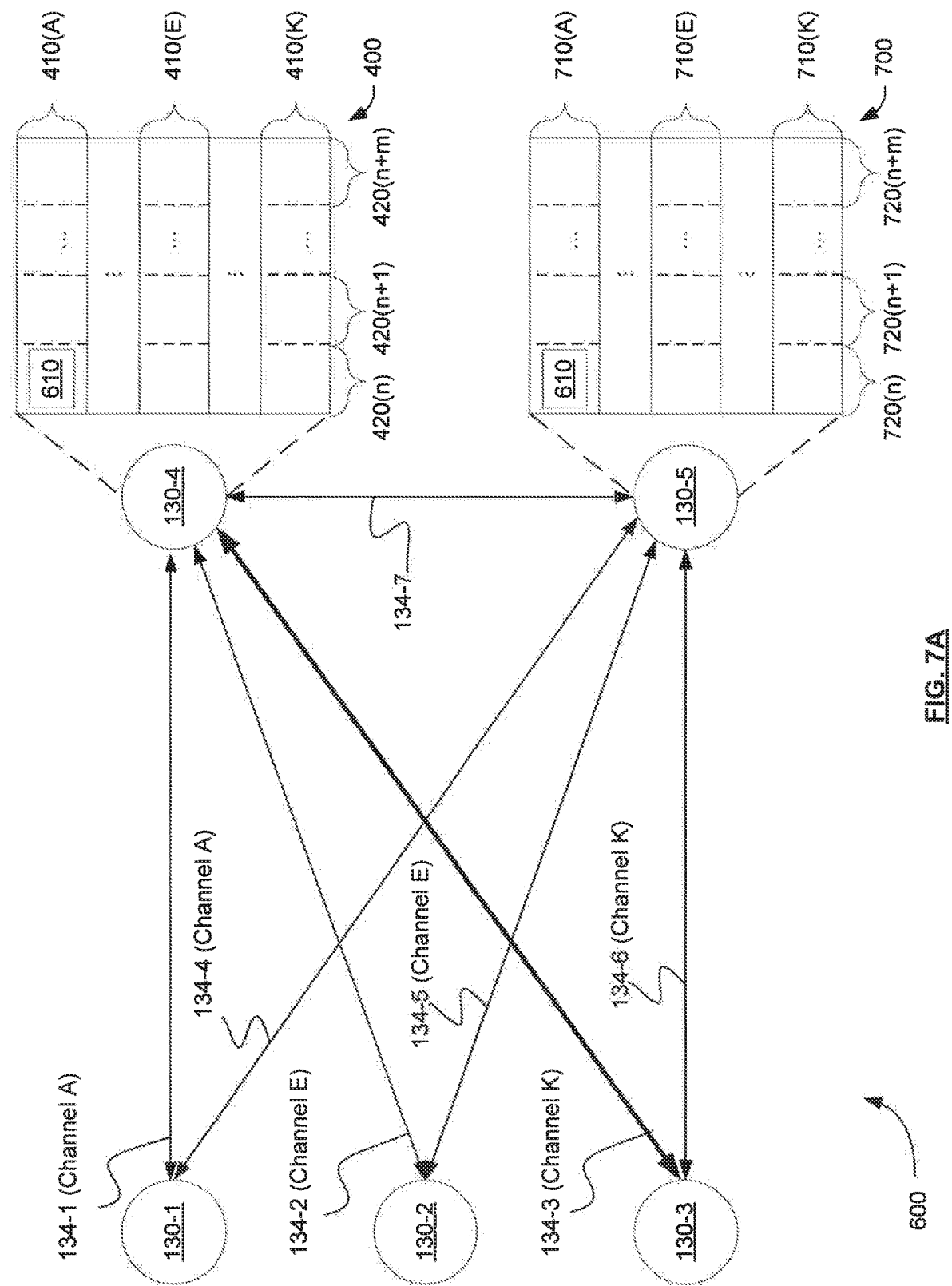
FIGS. 7A-7C illustrates the plurality of downstream nodes of FIG. 6 coordinating the processing of buffered data received from the plurality of upstream nodes, according to one embodiment of the present invention.
Figure 7B:
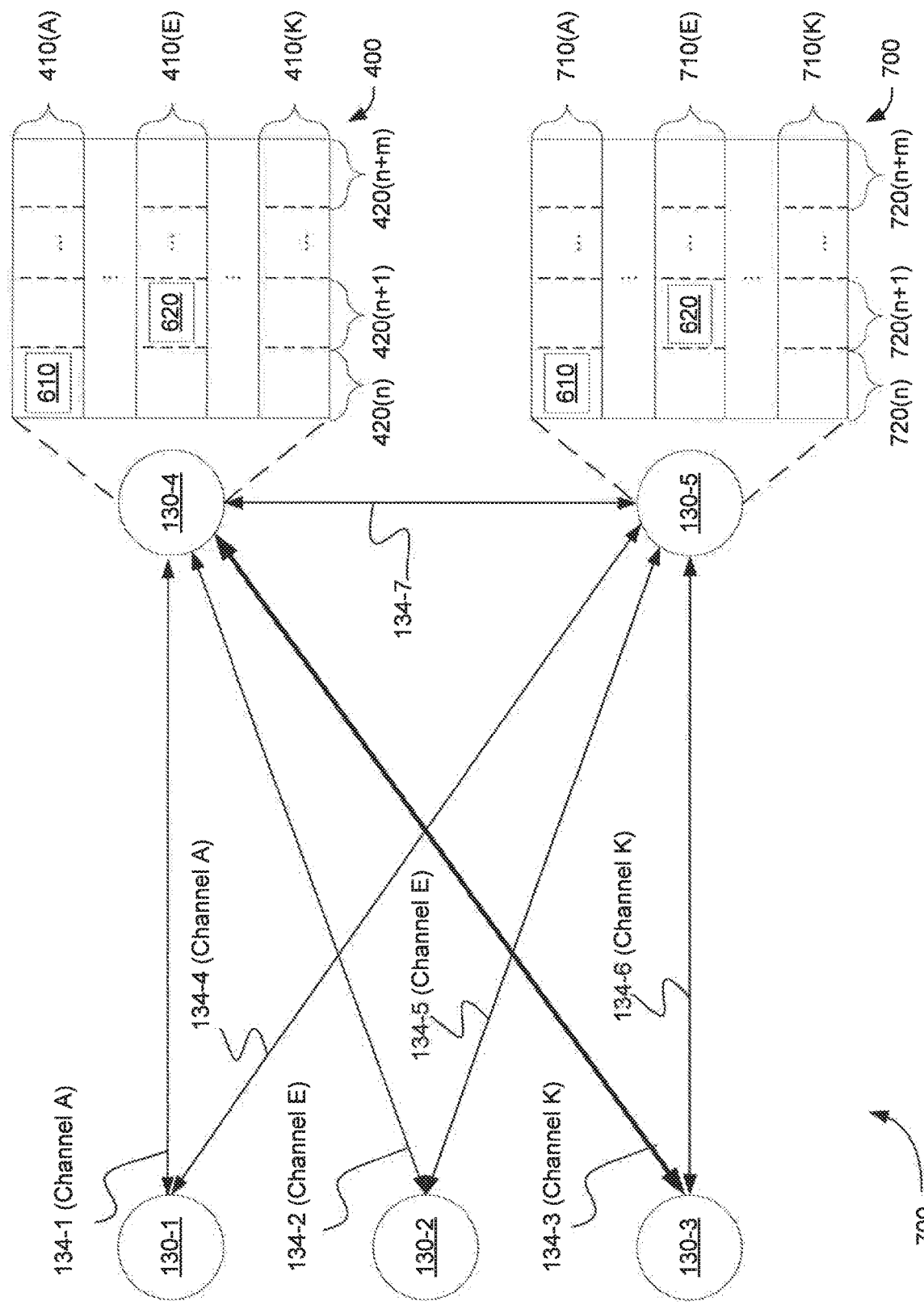
Figure 7C:
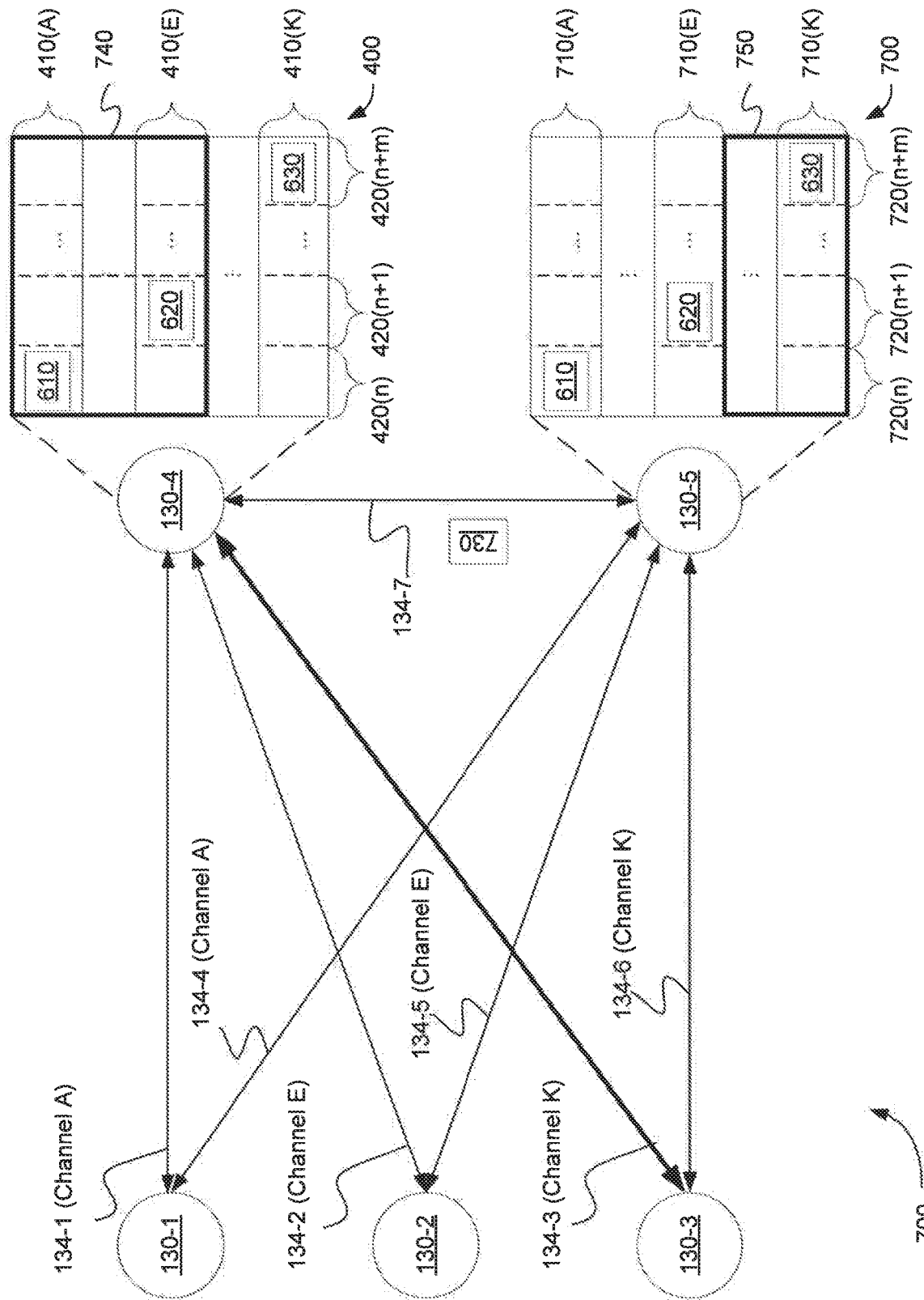

FIGS. 7A-7C illustrates the plurality of downstream nodes of FIG. 6 coordinating the processing of buffered data received from the plurality of upstream nodes, according to one embodiment of the present invention.

As shown in FIG. 7A, node 130-5 includes a buffer 700 similar to buffer 400 included within node 130-4. Specifically, buffer 700 includes a set of rows 710, where each row 710 corresponds to the various channels on which node 130-5 may receive data. Row 710(A) corresponds to channel A, row 710(E) corresponds to channel E, and row 710(K) corresponds to channel K. Buffer 700 also includes as set of columns 720, where each column 720 corresponds to a different time when node 130-5 may receive data. Column 720(n) corresponds to a time $t_n$ when node 130-5 receives data, column 720(n+1) corresponds to a time $t_{n+1}$ when node 130-5 receives data, and column 720(n+m) corresponds to a time $t_{n+m}$ when node 130-5 receives data.

Similar to node 130-4, when node 130-5 receives data on a specific channel at a specific time, node 130-5 buffers that data within the row 710 of buffer 700 corresponding to that specific channel and within the column 720 of buffer 710 corresponding to that specific time. Node 130-5 generally buffers all received data, although under normal circumstances node 130-5 may only process the specific rows 710 of buffer 700 corresponding to the actively listened channels.

In the exemplary scenario shown, nodes 130-4 and 130-5 receive data 610 on channel A at time $t_n$, and then buffer that data. Node 130-4 buffers data 610 within row 410(A) at column 420(n), and node 130-5 buffers data 610 within row 710(A) at column 720(n). Neither of nodes 130-4 and 130-5 listens to channel A at time $t_n$, and so those nodes may not be aware that data was received at time $t_n$. Thus, neither node 130-4 nor node 130-5 may immediately process data 610. Instead, those nodes may simply continue to buffer data, as described below in conjunction with FIG. 7B.

In FIG. 7B, nodes 130-4 and 130-5 receive data 620 on channel E at time $t_{n+1}$. Node 130-4 buffers data 620 within row 410(E) at column 420(n+1), and node 130-5 buffers data 620 within row 710(E) at column 720(n+1). Node 130-4 and node 130-5 alike are not listening to channel E at time $t_{n+1}$, and so those nodes may not be aware that data 620 was received. Thus, nodes 130-4 and 130-5 may not immediately process data 720 and simply continue buffering data, as described below in conjunction with FIG. 7C.

In FIG. 7C, nodes 130-4 and 130-5 receive data 630 on channel K at time $t_{n+m}$. Node 130-4 buffers data 630 within row 410(K) at column 420(n+m) and node 130-5 buffers data 630 within row 710(K) at column 720(n+m). Since node 130-4 is, in fact, listening to channel K at time $t_{n+m}$, node 130-4 then processes data 630. In doing so, node 130-4 may decode data 630 and identify a notification included therein.

The notification reflects the operational state of node 130-3, and, additionally, indicates to node 130-4 that other nodes 130 may have also transmitted notifications. In response to receiving the notification within data 630, node 130-4 indicates to node 130-5 that the notification was received by transmitting a message 730 to node 130-5.

In one embodiment, message 730 indicates that node 130-5 should process buffer 700 to identify data received on channels that were not actively listened by node 130-5. Accordingly, node 130-5 may process buffer 700 in response to receiving message 730 and then discover that data 610, 620, and 630 were received. Node 130-5 may then process data 610, 620, and 630 to identify notifications included therein. Node 130-4 may perform a similar procedure and process buffer 400 to identify data 610 and 620 and notifications included therein. Nodes 130-4 and 130-5 may perform this processing separately and/or in parallel with one another.

Persons skilled in the art will recognize that buffers 400 and 700 need not include exactly the same data. Buffers 400 and 700 may include some of the same data as well as other, different data. For example, nodes 130-4 and 130-5 may have certain neighboring nodes in common, as well as certain different neighboring nodes. Therefore, buffers 400 and 700 may include similar data received from neighboring nodes that are common to nodes 130-4 and 130-5 (such as nodes 130-1, 130-2, and 130-3), as well as different data received from different neighbors (not shown). Accordingly, when node 130-5 receives message 730, node 130-5 may then process data stored in buffer 700 and identify notifications that node 130-4 may not actually store within buffer 400.

In another embodiment, nodes 130-4 and 130-5 may coordinate the processing of data stored within buffers 400 and 700. In situations where buffers 400 and 700 store at least some similar data, node 130-4 may coordinate with node 130-5 in order to share the burden of processing this similar data. This technique may be implemented to expedite the processing of buffers 400 and 700. Alternatively, node 130-4 may lack the processing resources to process all of buffer 400, and therefore recruit node 130-5 to assist with that processing. In either case, node 130-4 may determine that node 130-4 will process portion 740 of buffer 400, and that node 130-5 should process portion 750 of buffer 700. Node 130-4 then transmits message 730 to node 130-5 indicating that portion 750 should be processed.

Persons skilled in the art will understand that the approach described above may be implemented with more than just two nodes. For example, node 130-4 could identify N neighboring nodes that buffer similar data, and then instruct each of those N neighbors to process a different buffer portion. Each buffer portion could be 1/N of the total buffer size, or node 130-4 could assign a specifically-sized portion to each node based on processing and/or memory capabilities, node status, and or other operational parameters, resources, limitations, and so forth, associated with each node.

In the example discussed herein, nodes 130-4 and 130-5 may reduce the time needed to discover that data 610 and 620 were received. Nodes 130-4 and 130-5 may then forward the notifications included within that data to server 154 more quickly than possible with node 130-4 alone, thereby improving the accuracy with which server 154 can detect network-wide events. The techniques described above in conjunction with FIGS. 6-7C are described in stepwise fashion below in conjunction with FIGS. 8A-8B.

Figure 8A:
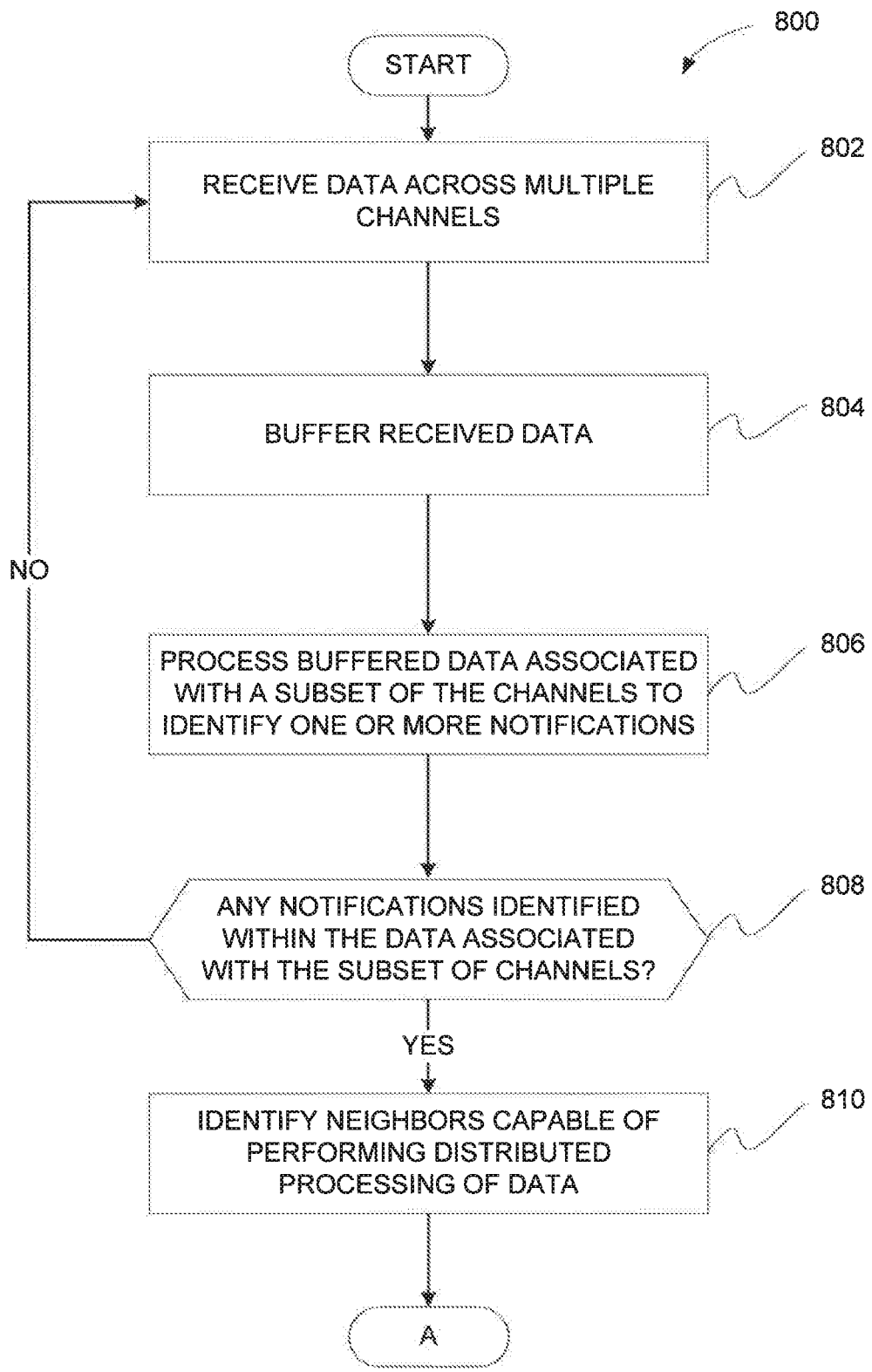
FIGS. 8A-8B illustrate a flow diagram of method steps for identifying notifications stored within a buffer and subsequently coordinating the processing of data within the buffer, according to one embodiment of the present invention.
Figure 8B:
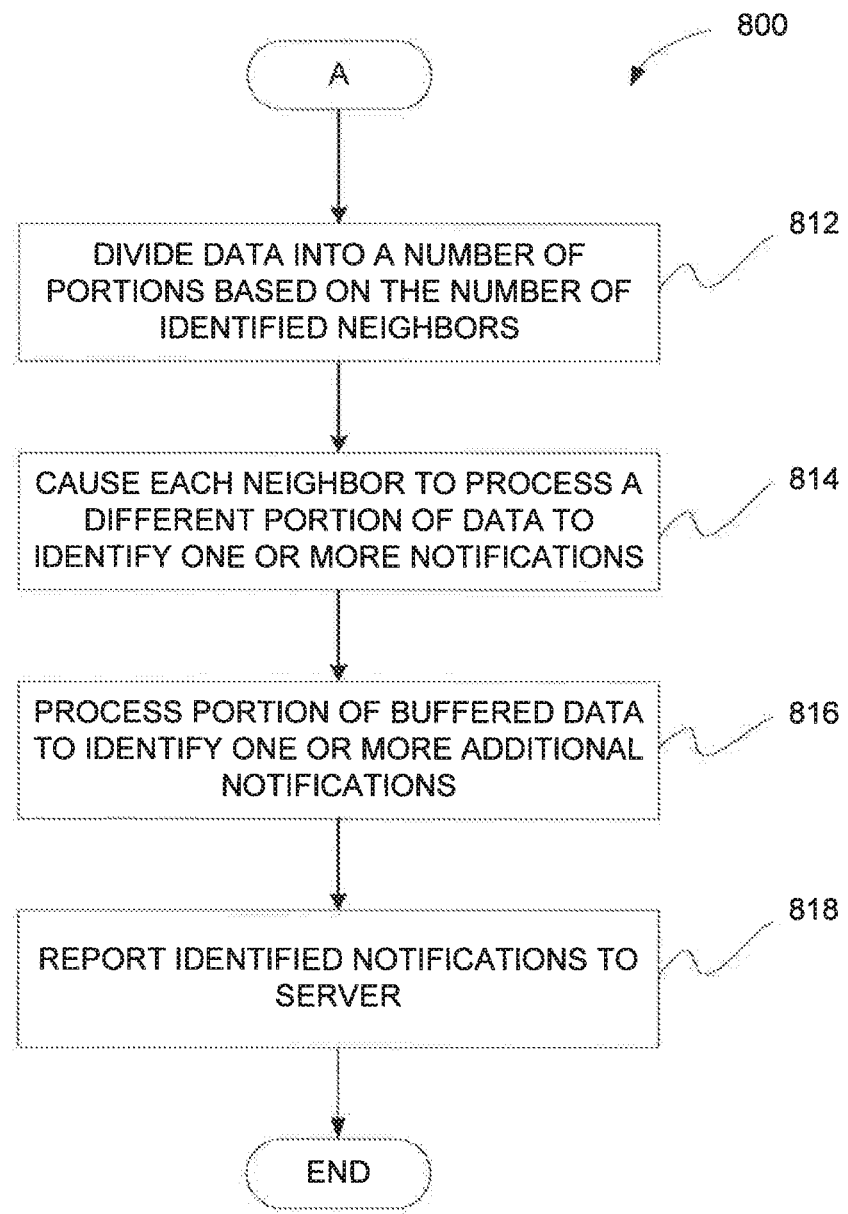

FIGS. 8A-8B illustrate a flow diagram of method steps for identifying notifications stored within a buffer and subsequently coordinating the processing of data within the buffer, according to one embodiment of the present invention. Although the method steps are described in conjunction with the systems of FIGS. 1-2, 4A-4C, and 6-7C, persons skilled in the art will understand that any system configured to perform the method steps, in any order, is within the scope of the present invention.

As shown in FIG. 8A, a method 800 begins at step 802, where a node 130 receives data across multiple channels. The data may be raw soft bits, demodulated bits, raw ADC samples, frequency and magnitude data, and so forth. The multiple channels may represent a band on which the node 130 is authorized to transmit and receive data. At step 804, the node 130 buffers the data received at step 802. In doing so, the node 130 may store the data in a buffer, such as buffer 400 shown in FIGS. 4A-4C and 7A-7C.

At step 806, the node 130 processes buffered data that is associated with a subset of the channels to identify any notifications that may be present in that data. The subset of the channels generally reflects one or more channels to which to node 130 actively listens.

At step 808, the node 130 determines whether any notifications have been identified within the buffered data associated with the subset of channels. If, at step 808, the node 130 does not identify any notifications, then the method 800 returns to step 802 and proceeds as described above. Otherwise, if the node 130 determines at step 808 that one or more notifications have been identified, then the method 800 proceeds to step 810. In one embodiment, the node 130 may proceed from step 808 to step 810 upon determining that a threshold number of notifications have been identified.

At step 810, the node 130 identifies any neighboring nodes capable of performing distributed processing of buffered data. The neighboring nodes may buffer similar data as the node 130, different data, or some similar data and some different data.

Referring now to FIG. 8B, at step 812, the node 130 divides the buffer into a number of portions based on the number of neighbors identified at step 810. Each portion may be similar in size, or may be specifically sized based on the status and/or capabilities of a specific neighbor.

At step 814, the node 130 causes each neighbor to process a different buffer portion to identify one or more notifications. In doing so, each neighbor may discover that data was received and buffered on channels that were not actively listened at the time the data was received. The neighbors may then process that data and identify notifications included therein.

At step 816, the node 130 processes a portion of the buffer included within that node to identify one or more additional notifications. At step 818, the node 130 reports all identified notifications to a network management entity, such as server 154. In doing so, node 130 may collect notifications from neighboring nodes that were identified by those nodes, or may also simply cause those nodes to transmit all identified notifications to the network management entity.

The approach described above in conjunction with FIGS. 6-8B may be implemented to effectively share the burden of buffer processing across many nodes that have access to similar data. In certain embodiments, one node may transmit buffered data to another node for processing. In other embodiments, one node may simply notify another node that buffer processing should occur because a network event may be underway.

In sum, a node in network is configured to buffer data received from other nodes across multiple channels. The node process a portion of the buffered data associated with a subset of those channels. When the node receives data on that subset of channels that includes a notification, the node then processes a larger portion of the buffered data associated with a larger number of channels. In doing so, the node may identify additional notifications include within data that was buffered but not previously processed. The node may also coordinate with other nodes in order to process buffered data upon identification of a notification.

At least one advantage of the techniques described herein is that the node is capable of identifying notifications received on channels to which the node was not actively listening. Accordingly, notifications that would otherwise be unnoticed by the node can be processed and forwarded across the network, thereby increasing the reliability of the network as a whole. When the notifications reflect a network-level event, such as a power outage, a network management entity can estimate the severity of that event with much greater accuracy because an increased number of notifications can be collected compared to conventional approaches. Further, when a multitude of notifications are transmitted simultaneously, e.g., in response to a network-level event, all of those notifications are buffered and then eventually processed. Accordingly, notifications that would otherwise be lost during periods of heavy traffic across the network can be properly identified and acted upon.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A node included in a wireless mesh network, the node comprising:
 a processor; and
 a buffer memory that is coupled to the processor and includes a plurality of rows for storing data received from a plurality of nodes also included in the wireless mesh network, wherein each row included in the plurality of rows corresponds to a different channel included in a plurality of channels,
 wherein, during operation, the processor processes data stored in a first row included in the plurality of rows to identify a first failure notification that has been received from a first node included in the plurality of nodes, and, in response to identifying the first failure notification, further processes data stored in one or more other rows included in the plurality of rows to identify one or more other failure notifications that have been received from one or more other nodes included in the plurality of nodes.

2. The node of claim 1, wherein the first failure notification and the one or more other failure notifications result from a power outage.

3. The node of claim 1, wherein the processor forwards the first failure notification and the one or more other failure notifications to a network management entity for further processing.

4. The node of claim 3, wherein the network management entity processes the first failure notification and the one or more other failure notifications to identify an event occurring within the wireless mesh network.

5. The node of claim 1, wherein the first row included in the plurality of rows is associated with a first channel included in the plurality of channels, the first channel corresponding to the first node, and wherein the first channel is actively listened to by the node when the data is received from the plurality of nodes.

6. The node of claim 5, wherein the processor processes the data stored to the first row included in the plurality of rows in response to receiving data from the first node via the first channel.

7. The node of claim 5, wherein the one or more other rows included in the plurality of rows are associated with one or more other channels included in the plurality of channels, the one or more other channels corresponding to the one or more other nodes included in the plurality of nodes, and wherein the one or more other channels are not actively listened to by the node when the data is received from the plurality of nodes.

8. The node of claim 1, wherein, in response to identifying the first failure notification, the processor further transmits a message to another node included in the plurality of nodes, wherein the another node comprises another buffer memory that stores data received from the plurality of nodes, and wherein the message causes the another node to process the data stored in the another buffer memory to identify a second failure notification.

9. The node of claim 8, wherein the second failure notification is received from an additional node included in the plurality of nodes.

10. The node of claim 8, wherein the node processes a first portion of the data received from the plurality of nodes, and the another node processes a second portion of the data received from the plurality of nodes, and wherein the second portion is different than the first portion.

11. A method implemented by a node included in a wireless mesh network, the method comprising:
 storing, in a buffer memory, data received from a plurality of nodes also included in the wireless mesh network, wherein the buffer memory includes a plurality of rows, and each row included in the plurality of rows corresponds to a different channel included in a plurality of channels;
 processing data stored in a first row included in the plurality of rows to identify a first failure notification that has been received from a first node included in the plurality of nodes; and
 in response to identifying the first failure notification, processing data stored in one or more other rows included in the plurality of rows to identify one or more other failure notifications that have been received from one or more other nodes included in the plurality of nodes.

12. The method of claim 11, wherein the first failure notification and the one or more other failure notifications result from a power outage.

13. The method of claim 11, further comprising forwarding the first failure notification and the one or more other failure notifications to a network management entity for further processing.

14. The method of claim 13, wherein the network management entity processes the first failure notification and the one or more other failure notifications to identify an event occurring within the wireless mesh network.

15. The method of claim 11, wherein the first row included in the plurality of rows is associated with a first channel included in the plurality of channels, the first channel corresponding to the first node, and wherein the first channel is actively listened to by the node when the data is received from the plurality of nodes.

16. The method of claim 15, wherein the node processes the data stored to the first row included in the plurality of rows in response to receiving data from the first node via the first channel.

17. The method of claim 15, wherein the one or more other rows included in the plurality of rows are associated with one or more other channels included in the plurality of channels, the one or more other channels corresponding to the one or more other nodes included in the plurality of nodes, and wherein the one or more other channels are not actively listened to by the node when the data is received from the plurality of nodes.

18. The method of claim 11, further comprising, in response to identifying the first failure notification, transmitting a message to another node included in the plurality of nodes, wherein the another node comprises another buffer memory that stores data received from the plurality of nodes, and the message causes the another node to process the data stored in the another buffer memory to identify a second failure notification.

19. The method of claim 18, wherein the second failure notification is received from an additional node included in the plurality of nodes.

20. The method of claim 18, wherein the node processes a first portion of the data received from the plurality of nodes, and the another node processes a second portion of the data received from the plurality of nodes, and wherein the second portion is different than the first portion.

21. One or more non-transitory computer-readable media storing program instructions that, when executed by one or more processors included in a node within a wireless mesh network, cause the one or more processors to perform the steps of:

storing, in a buffer memory, data received from a plurality of nodes also included in the wireless mesh network, wherein the buffer memory includes a plurality of rows, and each row included in the plurality of rows corresponds to a different channel included in a plurality of channels;

processing data stored in a first row included in the plurality of rows to identify a first failure notification that has been received from a first node included in the plurality of nodes; and in response to identifying the first failure notification, processing data stored in one or more other rows included in the plurality of rows to identify one or more other failure notifications that have been received from one or more other nodes included in the plurality of nodes.

* * * * *